April 14, 1959 E. BEMBENEK 2,882,452
SUPERVISED CONTROL CIRCUIT MEANS
Filed Dec. 30, 1957
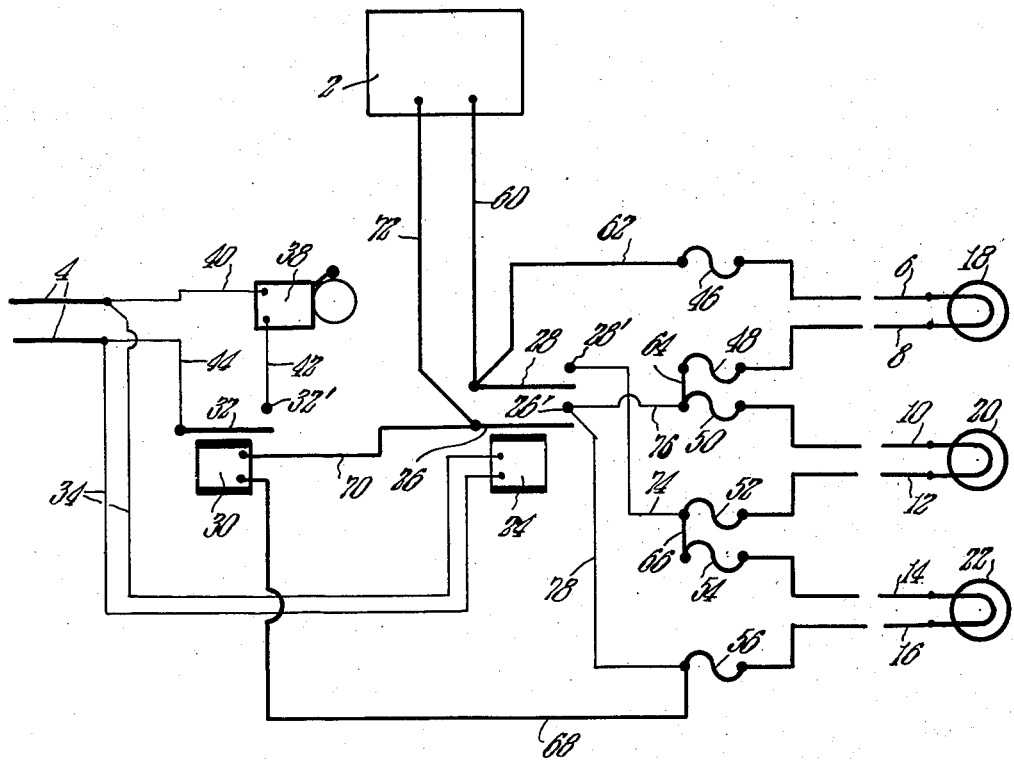
INVENTOR.
Edward Bembenek.
BY

United States Patent Office 2,882,452
Patented Apr. 14, 1959

2,882,452

SUPERVISED CONTROL CIRCUIT MEANS

Edward Bembenek, Springfield, Mass., assignor to The Standard Electric Time Company, Springfield, Mass., a corporation of Connecticut Application December 30, 1957, Serial No. 705,915

2 Claims. (Cl. 315—191)

This invention relates to improvements in emergency lighting systems and is directed more particularly to supervised control circuit means.

The principal object of the invention in a broad way is the provision of supervising means in combination with emergency lighting systems.

Emergency lighting systems are well known, are commonly supplied with energy from emergency power supplies during such emergencies as failure of the normal or main power supply. In emergency lighting systems the power supplies therefor are maintained in readiness, so that on a power failure, the emergency power supply energizes the circuits of the emergency lighting system.

It is desired and necessary that the emergency lighting system be in operable condition at all times so as to be capable of the lighting function during such emergencies as power failures.

Emergency lighting systems and the circuits thereof, during non-emergency periods, are frequently rendered inoperative by ruptured wiring, blown fuses, unserviceable light bulbs, etc., so that the system becomes inoperative for its intended function in an emergency.

According to the novel features of this invention in combination with an emergency lighting system, normal power supply and emergency power supply, there is provided means during non-emergency periods adapted to supervise the system and to automatically indicate inoperativeness thereof as and when inoperativeness occurs.

In a general way the emergency power supply is at all times in operative condition, for supplying energy to the emergency lighting system. In the event the emergency system is rendered inoperative there is an indication thereof under the control of the system so that inoperativeness may be remedied.

In a broad way means for indicating inoperativeness of the emergency lighting system is operable by the normal power supply, but is under control of the emergency lighting system and the power supply therefor.

In this way inoperativeness of the emergency lighting system, as may occur, is promptly indicated by the inoperativeness so that it may be readied for its emergency function.

Various changes and modifications may be made in the form of the apparatus of the invention to be disclosed in the form thereof presently preferred.

In the drawings, the figure is a wiring diagram illustrative of the novel features of the invention.

Referring now to the drawing more in detail the novel features of the invention will be described.

An emergency power supply is represented by 2 which is adapted to supply energy to the emergency lighting system and its circuits. Such may for purposes of disclosure, consist of a storage battery and apparatus operable by the normal power supply to charge and maintain the battery in condition to energize the emergency lighting system. The power supply may deliver energy at relatively low voltage, say 32 volts D.C. Any other desired form of emergency power supply may be employed, such as a mechanical electrical generating device not associated with a normal power source.

A normal power supply is represented by 4, and may be a 120 or 220 volt A.C. line, such as is common in buildings where emergency lighting systems are used.

Emergency lighting means may consist of any desired number of lines such as 6 and 8, 10 and 12, and 14 and 16. There may be any desired number of lamps in the lines, as represented by 18, 20 and 22 and these may be located where emergency lighting is desired or necessary.

A relay is represented by 24 and has circuit closing arms 26 and 28 for engaging contacts 26' and 28'. The said relay will be of the type such that when energized the arms are releasably held in the open position shown. When the relay is deenergized the arms will engage their respective contacts.

A relay 30 is provided which is of a type similar to relay 24 wherein the arm 32 is held in open position, and out of contact with the contact 32, as the relay is energized.

Connections 34 extend from the normal power supply 4 to the relay 24. Energy is supplied said relay to hold the arms thereof in their open position. On failure of the power supply 4 the relay is deenergized, and the arms thereof engage the contacts 26' and 28'.

An indicator is provided which may be in the form of a sound emitting device 38. Any other form of indicator desired may be used. Said indicator is connected by 40 to the normal power supply, and by 42 to contact 32' of relay 30. The arm 32 of said relay is connected by 44 to the normal power supply.

Fuses 46 to 56 are shown in the emergency lighting circuits which may be of the usual, or any desired form.

Arm 28 of relay 24 is connected by 60 to the emergency power supply 2, and by 62 to fuse 46. The fuses 48 and 50 are connected by 64, and 66 connects the fuses 52 and 54.

Fuse 56 is connected by 68 to relay 30, said relay is connected by 70 to arm 26 of relay 24, and the arm is connected by 72 to the power supply 2.

Contact 28' of relay 24 is connected by 74 to fuse 52. Contact 26' of said relay is connected by 76 to fuse 50, and by 78 to fuse 56.

It will be assumed as the circuitry is shown that, relay 24 is being energized from the normal power supply 4, to hold the arms 26 and 28 in circuit open positions.

Energy flows from the emergency power supply 2 through lines 60 and 62, and series connected lamps and fuses, through line 68 to and through relay 30, and by 70 and 72 to the power supply 2. Thus the relay 30 is energized so that arm 32 thereof is held in the open circuit position shown.

It is intended that the resistance or impedance in the series connected components, particularly in the relay, will be such that energy at the lamps will not be sufficient for lighting purposes, while at the same time the circuitry is in condition for operation when called upon.

Should a wire or component in the series circuit rupture or become unserviceable so that series circuit is disrupted, the relay 30 becomes deenergized whereupon the indicating means 38 is operated by the normal power supply.

The indication of unserviceability of the emergency lighting system affords an opportunity for making such repairs or substituting such components as may be necessary to render the system in condition for operation in an emergency.

In the event there is a failure of the normal power supply relay 24 becomes deenergized so that arms 26 and 28 make the contacts 26' and 28'. The lamp circuits and their associated fuses are then connected in parallel to the emergency power supply whereby they are supplied with energy for lighting purposes.

Thus under normal conditions relay 24 is energized from the normal power supply so that the lighting circuit components are in series, and the relay 30 is energized. Said relay 30 controls operation of the indicator by the normal power supply.

Any disruption of the series lighting circuit deenergizes relay 30 so that the indicator is operated from the normal power supply.

On failure of the normal power supply, and as relay 24 is therefor deenergized, arms 26 and 28 assume their circuit closing positions so that the lighting circuits are connected in parallel to the emergency supply, for their lighting function.

As stated the indicator 38 may take any form desired, such as a lamp or the like, adapted for operation from a normal source of energy under control of the emergency lighting system, and connections from the source of emergency energy.

The diagram shows the emergency lighting system, control relay 30, and emergency power supply or source of emergency energy in the non-lighting condition of the emergency system. As and when relay 24 becomes deenergized due to power failure, the power supply and emergency system are in lighting condition.

The non-lighting or lighting condition of the emergency system is controlled by energy or failure of energy from the normal power supply. That is the non-lighting condition of the emergency system is dependent on energy from the normal power source.

The operation of the indicator is controlled by the circuitry of the emergency system and source of emergency energy. That is the indicator is operated from the normal source of energy at such times as the continuity of the emergency systems becomes disrupted.

In a broad way the emergency system is maintained in non-lighting condition from the normal power source until a rupture occurs in said system, and the indicator is rendered inoperative by the emergency system unless a rupture occurs.

While circuitry connects the emergency lighting system and source of emergency energy, the said lighting system is in non-lighting condition when the emergency lighting circuits are in series as in the figure.

The emergency lighting system is in lighting condition when the emergency lighting circuits are in parallel, as when the relay 24 is deenergized by normal power failure. In the non-lighting condition of the emergency system, any failure therein is indicated by 38 which is operated by the normal source of energy. There is no indication of failure of the emergency lighting system by the indicator 38 when the system is in emergency lighting condition. As pointed out there is sufficient resistance or impedance in the circuitry and components to maintain the emergency system or circuits in non-lighting condition when the components are connected as in the figure.

Within the spirit and scope of the invention it may be desired to accomplish various changes and modifications, therefor it is desired to be limited, if at all, by the appended claims rather than the foregoing description.

I claim:

1. Emergency lighting apparatus comprising in combination a main source of energy subject to failures and a continuously operable source of emergency energy, a plurality of emergency lights isolated electrically from said main source, circuitry including shiftable means for connecting said lights and emergency source in series during non-emergency periods or for connecting said lights in parallel and to said source during emergency periods, supervising means including a separate indicator, means in said circuitry arranged with the lights and emergency source in series to automatically connect the indicator to a source of energy for operation thereof on failure in the series connections, and means connected to the main source of energy controlling said shiftable means whereby on energy failure in said main source said parallel connections of the lights to the emergency source is substituted for the series connections thereof.

2. The combination with a main source of electrical energy of emergency lighting apparatus comprising, a plurality of emergency lights, an emergency source of energy for said lights, circuitry adapted for connecting said lights and emergency source in series in a non-emergency period or for connecting said lights in parallel relation and to said source in an emergency period on failure of the main source, a relay connected to and operable from said main source having circuit closing means included in said circuitry and adapted when energized in a non-emergency period to hold said means in open position for series connection of said lights and emergency source and when de-energized on failure of said main source in an emergency period to release said means for connection of said lights in parallel relation and to said emergency source, an indicator, connections between said indicator and main source, a relay connected to said circuitry having a circuit closing member in said connections and adapted when energized to hold said member in non-circuit closing position and when de-energized by failure within the emergency apparatus to release said member to circuit closing position for energizing of the indicator by the main source.

References Cited in the file of this patent

UNITED STATES PATENTS

| | | |
|---|---|---|
| 1,558,949 | Thompson et al. | Oct. 27, 1925 |
| 2,501,017 | Abrums | Mar. 21, 1950 |
| 2,562,274 | Hollins | July 31, 1951 |

FOREIGN PATENTS

| | | |
|---|---|---|
| 538,673 | Great Britain | Aug. 12, 1941 |